United States Patent Office 2,727,017
Patented Dec. 13, 1955

2,727,017
POLYMERIZATION OF CAPROLACTAM

George H. Berthold, Guilford, Conn., assignor to Olin Mathieson Chemical Corporation, a corporation of Virginia No Drawing. Application March 5, 1954,
Serial No. 414,493

8 Claims. (Cl. 260—78)

This invention relates to the polymerization of caprolactam and more particularly to a process of polymerizing caprolactam in which an alkali metal salt of 2-pyrrolidone is employed as a catalyst.

I am aware of the use of various catalysts in the polymerization of caprolactam and other cyclic amides. In such processes the polymerization is generally performed by heating the amide to a predetermined temperature for a specified time in the presence of the catalyst. While some catalysts have been discovered which produce fairly satisfactory results in the polymerization of various cyclic amides, I have discovered a group of catalysts which is more satisfactory and more effective as a catalyst in the polymerization of caprolactam than any of the known catalysts.

The material that I propose to use as a catalyst in the polymerization of caprolactam is an alkali metal salt of 2-pyrrolidone, and more specifically I prefer to use sodium 2-pyrrolidone. Sodium pyrrolidone, and the other alkali metal salts are readily prepared from pyrrolidone, are easy to handle, and serve as a very effective catalyst in the polymerization of caprolactam. The structure of pyrrolidone and its alkali metal salts is as follows:

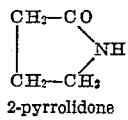

2-pyrrolidone

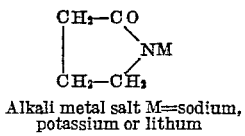

Alkali metal salt M=sodium, potassium or lithium

When caprolactam is heated to a temperature between 230° and 260° C. in the presence of one of these salts, polymerization is effected more rapidly than with other known catalysts and a polymer is obtained that is of desirably low color, from which tough fibers and strong film may be prepared. The alkali metal salts of 2-pyrrolidone are less expensive than other catalysts, can be stored without deterioration and are easier to handle.

The catalyst is added to the caprolactam in the proportion of 0.35 to about 1.5 mole percent of the material being polymerized, and polymerization is effected in a period of less than 10 minutes. The salt is first prepared as follows: 0.1 mole of sodium metal was added gradually to 50 g. of isopropyl alcohol maintained at its boiling point in a flask equipped with a reflux condenser. Heating was continued until the sodium had all dissolved. A solution of about 0.1 mole of 2-pyrrolidone in 100 g. of isopropyl alcohol was then added. Sodium 2-pyrrolidone was obtained as a fluffy white powder by evaporating solvent under reduced pressure.

A typical polymerization was carried out as follows: caprolactam was heated to 260° C. in a suitable vessel immersed in a liquid heating bath and in an atmosphere of nitrogen, a slow stream of which was bubbled through the molten caprolactam. Sodium 2-pyrrolidone was added in an amount corresponding to 0.5 mole percent of the caprolactam. Polymerization was initiated immediately as nitrogen bubbles were trapped in the melt within 50 seconds after the addition of catalyst. About 2 minutes after the addition of the catalyst tough fibers could be drawn from the melt. The polymerization vessel and its contents were quenched in ice water. The polymer solidified to a tough horny mass which was only slightly colored with a yellow tint.

The following table summarizes a series of polymerizations carried out with various proportions of alkali metal salt of 2-pyrrolidone as catalyst, the polymeric product in every case yielding fibers capable of being cold drawn and the product being colorless, except for a slight yellowish or tan tinge.

| Mole Percent of Catalyst | Polymerization Temperature, °C. | Polymerization Time | |
|---|---|---|---|
| | | Min. | Sec. |
| 1.5 | 230 | 5 | 38 |
| 1.0 | 230 | 5 | 05 |
| 1.25 | 245 | 3 | 59 |
| 1.0 | 245 | 2 | 13 |
| 0.75 | 245 | 2 | 53 |
| 1.0 | 260 | 2 | 37 |
| 0.75 | 260 | 3 | 24 |
| 0.5 | 260 | 1 | 57 |
| 0.35 | 250 | 7 | 35 |
| 0.35 | 260 | 2 | 0 |

As stated, by this process I have obtained polymers of caprolactam of superior characteristics. The alkali metal salts of 2-pyrrolidone, in addition to producing polymers of caprolactam of superior quality have the additional advantage of being easy to prepare and handle, and can be stored with less likelihood of deterioration than many of the other catalysts.

I claim:

1. The process of polymerizing caprolactam which comprises heating caprolactam in the presence of an alkali metal salt of 2-pyrrolidone.

2. The process of polymerizing caprolactam which comprises heating caprolactam in the presence of sodium salt of 2-pyrrolidone.

3. The process of polymerizing caprolactam which comprises heating caprolactam in the presence of potassium salt of 2-pyrrolidone.

4. The process of polymerizing caprolactam which comprises heating caprolactam in the presence of lithium salt of 2-pyrrolidone.

5. The process of claim 1 in which the mixture is heated to a temperature of 230° to 260° C.

6. The process of claim 1 in which the mixture is heated to a temperature of approximately 260° C.

7. The process of claim 1 in which the 2-pyrrolidone salt is present in the proportion of 0.35 to about 1.5 mole percent of the caprolactam being polymerized.

8. The process which comprises heating caprolactam to a temperature of approximately 260° C. in an atmosphere of nitrogen, adding approximately 0.5 mole percent of sodium 2-pyrrolidone thereto, and maintaining the temperature of 260° C. for approximately 2 minutes.

References Cited in the file of this patent

UNITED STATES PATENTS 2,638,463    Ney    May 12, 1953

OTHER REFERENCES

Ser. No. 370,142, Schlack (A. P. C.), published June 22, 1943.

Hanford et al.: J. Polymer Science, April 1948, vol. 3, No. 2, pages 167–172.